United States Patent
Salamon et al.

(10) Patent No.: US 10,769,021 B1
(45) Date of Patent: Sep. 8, 2020

(54) CACHE PROTECTION THROUGH CACHE

(75) Inventors: Victor Salamon, Alberta (CA); Paul A. Shelley, Alberta (CA); Ronald C. Unrau, Alberta (CA); Steven R. Bromling, Alberta (CA)

(73) Assignee: EMC IP Holding Company LLC, Hopkinton, MA (US)

( * ) Notice: Subject to any disclaimer, the term of this patent is extended or adjusted under 35 U.S.C. 154(b) by 619 days.

(21) Appl. No.: 12/930,247

(22) Filed: Dec. 31, 2010

(51) Int. Cl.
- G06F 11/14 (2006.01)
- G06F 12/0866 (2016.01)
- G06F 11/10 (2006.01)
- G06F 12/0815 (2016.01)
- G06F 11/16 (2006.01)

(52) U.S. Cl.
CPC ...... G06F 11/1438 (2013.01); G06F 11/1064 (2013.01); G06F 11/1497 (2013.01); G06F 11/1633 (2013.01); G06F 12/0815 (2013.01); G06F 12/0866 (2013.01)

(58) Field of Classification Search
CPC ............ G06F 11/1438; G06F 11/1497; G06F 11/1633; G06F 11/1064; G06F 12/0866; G06F 12/0815
USPC ........................................................ 714/6.11
See application file for complete search history.

(56) References Cited

U.S. PATENT DOCUMENTS

| | | | |
|---|---|---|---|
| 5,742,792 A | 4/1998 | Yanai et al. | |
| 7,266,706 B2 | 9/2007 | Brown et al. | |
| 7,577,722 B1 | 8/2009 | Khandekar et al. | |
| 7,822,939 B1 | 10/2010 | Veprinsky et al. | |
| 7,836,018 B2 | 11/2010 | Oliveira et al. | |
| 2004/0215883 A1* | 10/2004 | Bamford et al. | 711/129 |
| 2005/0160132 A1* | 7/2005 | Van Doren et al. | 709/200 |
| 2006/0031450 A1 | 2/2006 | Unrau et al. | |
| 2006/0069887 A1 | 3/2006 | LeCrone et al. | |
| 2006/0075057 A1* | 4/2006 | Gildea | H04L 67/1097 709/212 |
| 2006/0101209 A1* | 5/2006 | Lais et al. | 711/137 |
| 2008/0140937 A1* | 6/2008 | Nalawade et al. | 711/119 |
| 2008/0195820 A1* | 8/2008 | Lais et al. | 711/146 |
| 2008/0313405 A1* | 12/2008 | Sakata et al. | 711/122 |
| 2009/0070541 A1 | 3/2009 | Yochai et al. | |
| 2009/0112789 A1 | 4/2009 | Oliveira et al. | |
| 2009/0112811 A1 | 4/2009 | Oliveira et al. | |
| 2009/0112880 A1 | 4/2009 | Oliveira et al. | |

(Continued)

OTHER PUBLICATIONS

J. Matthews et al., "Virtual Machine Contracts for Datacenter and Cloud Computing Environments," ACDC '09, Jun. 19, 2009, Barcelona, Spain, 6 pp.

(Continued)

*Primary Examiner* — Jigar P Patel
(74) *Attorney, Agent, or Firm* — Muirhead and Saturnelli, LLC (57) ABSTRACT

A cache coherency protection system provides for data redundancy by sharing a cache coherence memory pool for protection purposes. The system works consistently across all communication protocols, yields improved data availability with potentially less memory waster and makes data availability faster in node/director failure scenarios. According to various embodiments, the cache coherency protection system may include a writer/requester director that receives a write request from host, a protection target director that is a partner of the writer/request director and a directory.

17 Claims, 8 Drawing Sheets

(56) References Cited

U.S. PATENT DOCUMENTS

2009/0112921 A1    4/2009   Oliveira et al.
2010/0162036 A1*   6/2010   Linden et al. .................... 714/4
2010/0325367 A1*  12/2010   Kornegay et al. ............ 711/143

OTHER PUBLICATIONS

W. Zeng et al., "Cloud Service and Service Selection Algorithm Research," GEC '09, Jun. 12-14, 2009, Shanghai, China, pp. 1045-1048.
"Architectural Strategies for Cloud Computing," Oracle White Paper in Enterprise Architecture, Aug. 2009, 18 pp.
"VMware Virtual Machine File System: Technical Overview and Best Practices," VMware Technical White Paper, Version 1.0, WP-022-PRD-01-01, 2007, 19 pp.
"IT in the Cloud: Using VMware vCloud for Reliable, Flexible, Shared IT Resources," VMware White Paper, 2008, 8 pp.
"VMware vSphere, the First Cloud Operating System, Provides an Evolutionary, Non-disruptive Path to Cloud Computing," VMware White Paper, 2009, 8 pp.
"EMC Symmetrix VMAX and VMware Virtual Infrastructure: Applied Technology," EMC Corporation, White paper, May 2010, 44 pp.
"Using VMware Virtualization Platforms with EMC VPLEX: Best Practices Planning," EMC Corporation, White paper, Aug. 2010, 45 pp.
"Workload Resiliency with EMC VPLEX: Best Practices Planning," EMC Corporation, White paper, May 2010, 19 pp.
"Implementation and Planning Best Practices for EMC VPLEX," EMC Corporation, Technical Notes, Oct. 25, 2010, 37 pp.
D. Leijen et al., "Parallel Performance: Optimize Managed Code for Multi-Core Machines," MSDN Magazine, Oct. 2007, 11 pp.

\* cited by examiner

CACHE PROTECTION THROUGH CACHE

TECHNICAL FIELD

This application is related to the field of data storage and, more particularly, to systems for managing data sharing on a storage network.

BACKGROUND OF THE INVENTION

In current storage networks, and particularly storage networks including geographically remote directors (access nodes) and storage resources, preserving or reducing bandwidth between resources and directors is highly desirable. Data access may be localized, in part to improve access speed to data blocks requested by host devices. Caching data blocks at directors provides localization, however, it is desirable that the cached data be kept coherent with respect to modifications at other directors that may be caching the same data. An example of a system for providing distributed cache coherence is described in U.S. Patent App. Pub. No. 2006/0031450 to Unrau et al., entitled "Systems and Methods for Providing Distributed Cache Coherency," which is incorporated herein by reference. Other systems and techniques for managing and sharing storage array functions among multiple storage groups in a storage network are described, for example, in U.S. Pat. No. 7,266,706 to Brown et al. entitled "Methods and Systems for Implementing Shared Disk Array Management Functions," which is incorporated herein by reference.

In a distributed cache coherence model employing a dedicated protection memory area, speedy data protection may be provided under certain communication protocols. However, under certain conditions and scenarios, a design based on a dedicated protection memory area may lead to memory waste and may yield sub-optimal data availability.

Accordingly, it would be desirable to provide an efficient cache coherency system and method in connection with storing and managing data shared over a network.

SUMMARY OF THE INVENTION

According to the system described herein, a method for providing cache coherency protection includes receiving a data write request for a data block at a first director. The data block is stored in a cache of the first director. A copy of the data block is transmitted to a second director, and the copy of the data block is stored in a cache of the second director. A directory is maintained that identifies a location of the data block. In response to a read request for the data block, a cache hit may be enabled for the data block via access of the data block at the first director or the second director. The directory may include a plurality of components that are distributed among at least the first director and the second director. The first director may manage the location information of the copy of the data block and/or the directory may manage the location information of the copy of the data block. In response to failure of one of: the first director and the second director, a failure recovery process may be initiated using the data block in the cache of the other of: the first director and the second director. In response to a second data write request involving a write to the data block to generate a new data block: the new data block may be stored in a cache of a director that receives the second data write request; a copy of the new data block may be transmitted to a cache of a partner director that is a partner of the director that receives the second data write request; and the data block may be invalidated on the first director and the second director.

According further to the system described herein, a non-transitory computer readable medium storing computer software for providing cache coherency protection, the computer software includes executable code that receives a data write request for a data block at a first director. Executable code may be provided that stores the data block in a cache of the first director. Executable code may be provided that transmits a copy of the data block to a second director and the copy of the data block is stored in a cache of the second director. Executable code may be provided that maintains a directory that identifies a location of the data block. Executable code may be provided that, in response to a read request for the data block, enables a cache hit for the data block via access of the data block at the first director or the second director. The directory may include a plurality of components that are distributed among at least the first director and the second director. The first director may manage location information of the copy of the data block and/or the directory may manage the location information of the copy of the data block. Executable code may be provided that, in response to failure of one of: the first director and the second director, initiates a failure recovery process using the data block in the cache of the other of: the first director and the second director. Executable code that, in response to a second data write request involving a write to the data block to generate a new data block: stores the new data block in a cache of a director that receives the second data write request; transmits a copy of the new data block to a cache of a partner director that is a partner of the director that receives the second data write request; and invalidates the data block on the first director and the second director.

According further to the system described herein, a system for providing cache coherency protection includes a first director having a cache, wherein a data block is stored on the cache of the first director. A second director is provided having a cache, wherein a copy of the data block is stored on the cache of the second director. A directory identifies a location of the data block, wherein the directory is distributed among at least the first directory and the second directory. In response to a read request for the data block, a cache hit may be enabled for the data block via access of the data block at the first director or the second director. The first director may manage location information of the copy of the data block and/or the directory may manage the location information of the copy of the data block. In response to failure of one of: the first director and the second director, a failure recovery process may be initiated using the data block in the cache of the other of: the first director and the second director. The system may further include additional directors including a third director and a fourth director that is a partner of the third director. In response to a second data write request that is received at the third director involving a write to the data block to generate a new data block: the new data block may be stored in a cache of the third director; a copy of the new data block may be transmitted to a cache of the fourth director; and the data block may be invalidated on the first director and the second director. A director, such as the second director, may be selected as a protection target of another director, such as the first director, using an algorithm.

BRIEF DESCRIPTION OF THE DRAWINGS

Embodiments of the system described herein are explained with reference to the several figures of the drawings, which are briefly described as follows.

DETAILED DESCRIPTION OF VARIOUS EMBODIMENTS

Figure 1:
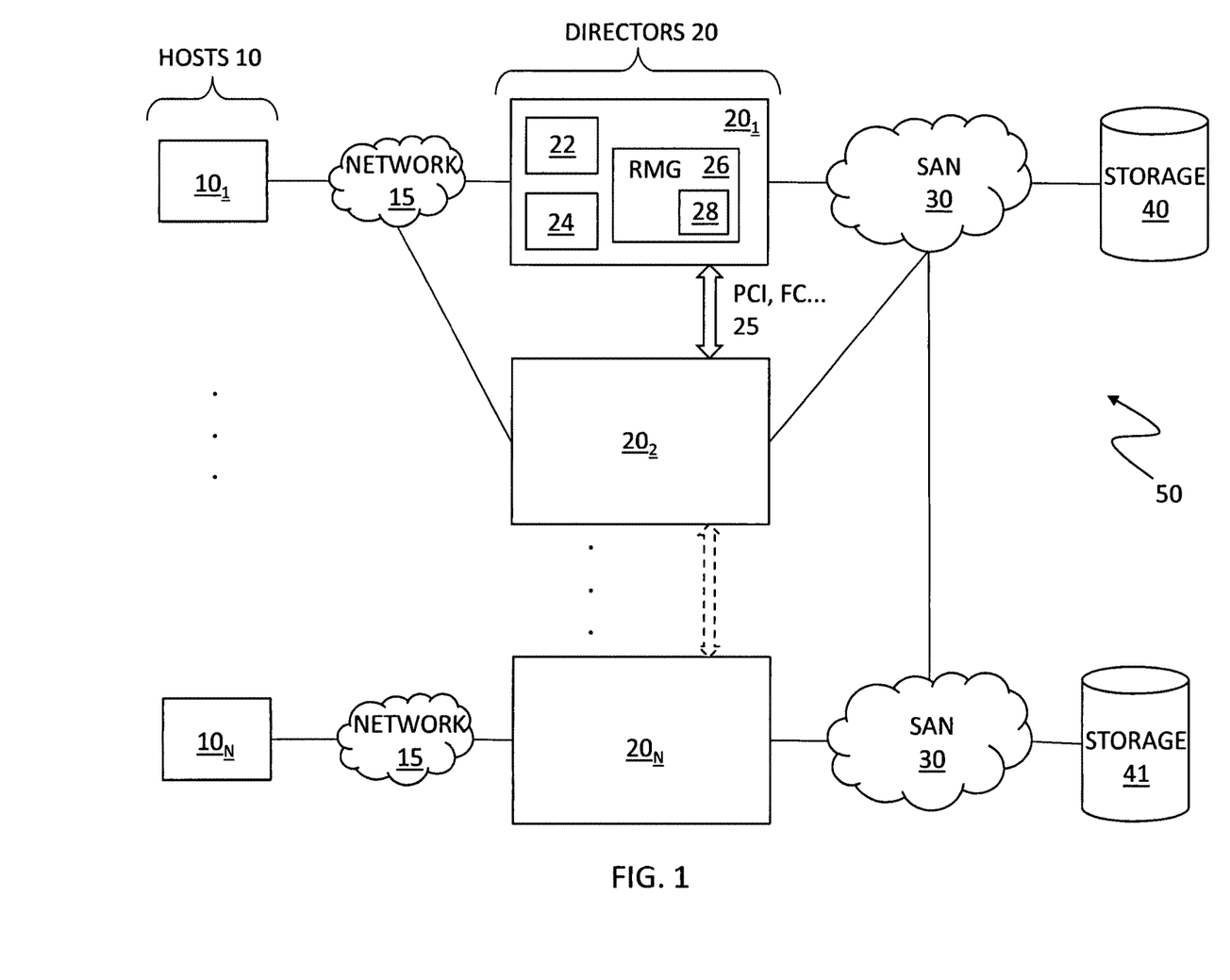
FIG. 1 shows a basic network configuration that may be used in accordance with an embodiment of the system described herein.

FIG. 1 shows a basic network configuration 50 that may be used in accordance with an embodiment of the system described herein. As shown, a plurality of host devices 10 ($10_1$ to $10_N$) are communicably coupled with a plurality of directors 20 ($20_1$, $20_2$ to $20_N$) that may function as access nodes of the system. Each of the directors (access nodes) 20 may include a processor (CPU) component 22, such as a microprocessor or other intelligence module, a cache component 24 (e.g., RAM cache), an instance of a directory manager (RMG) 26 and/or other local storage and communication ports. (In general, "N" is used herein to indicate an indefinite plurality, so that the number "N" when referred to one component does not necessarily equal the number "N" of a different component. For example, the number of hosts 10 does not, but may, equal the number of directors 20 in FIG. 1.) Cache memory may be considered memory that is faster and more easily accessible by a processor than other non-cache memory used by a device.

Each of the hosts 10 may be communicably coupled to one or more of directors 20 over one or more network connections 15. It is noted that host devices 10 may be operatively coupled with directors 20 over any of a number of connection schemes as required for the specific application and geographical location relative to each of the directors 20, including, for example, a direct wired or wireless connection, an Internet connection, a local area network (LAN) type connection, a wide area network (WAN) type connection, a VLAN, a proprietary network connection, etc.

Each of the directors 20 may also include, or be communicably coupled with, one or more array management functions (AMFs), and may be communicably coupled with one or multiple storage resources 40, 41, each including one or more disk drives and/or other storage volume, over a storage area network (SAN) 30, and/or other appropriate network, such as a LAN, WAN, etc. The directors 20 may be located in close physical proximity to each other or one or more may be remotely located, e.g., geographically remote, from other directors.

Each of the directors 20 may also be able to intercommunicate with other directors over the SAN 30 and/or over other communication networks or mediums such as over a PCI bus or a Fibre channel (FC) network 25, or over the network 15. Various of the directors 20 may be grouped together at one or more sites in connection with the multiple storage resources 40, 41. The system described herein may be used in connection with a VPLEX product produced by EMC Corporation of Hopkinton, Mass.

Each RMG 26 may be responsible for providing cache coherence mechanisms for shared data across a distributed set of directors. The set of directors that are caching data from a shared data volume may be called a share group. In general, the RMG 26 may include a module with software executing on a processor or other intelligence module (e.g., ASIC) in a director. The RMG 26 may be implemented in a single director or distributed across multiple intercommunicating directors. In certain aspects, each of the directors 20 may be embodied as a controller device, or blade, communicably coupled to the storage network 30, such as a storage area network (SAN), that allows access to data stored on the storage network. However, it may be appreciated that a director may also be embodied as an intelligent fabric switch, a hub adapter and/or other appropriate network device. Because Locality Conscious Directory Migration (LCDM) is applicable to databases, any suitable networked compute node may be configured to operate as a director with RMG functionality. For example, an RMG may be run on a desktop computer with a network connection.

Distributed cache coherence may reduce bandwidth requirements between geographically separated directors by allowing localized (cached) access to remote data. The base coherence unit in the RMG 26 is a logical block of data that may be referred to as a page, but it is noted that the RMG 26 may allow for operations at both the sub-page and the multi-page levels. A page owner is the director which has the page in its cache. A directory may be maintained that is a collection of a totality of directory entries, each encoding distributed sharing knowledge for a specific page. The directory may be distributed across multiple directors 20 and the RMG 26 of each of the directors 20 may include a portion 28 of the directory. A chunk is a specific number of directory entries for a set of consecutive pages, and a chunk owner is the director that holds the chunk corresponding to active pages in it. A meta-directory may be used to provide a mapping between chunk owners and directors. A dirty page is a page that needs to be flushed to disk in order for the page to be considered safe from multi-directory failure. When concurrent cache operations are active on a page, the directory entry may lock and synchronize access to the distributed resource. Directory information may be kept current through point-to-point messages sent between the affected directors. The RMG cache coherence messaging dialog may allow each RMG to share pages from remote caches (e.g., when read requests miss in the local cache) and invalidate remote cached copies (e.g., when write requests supersede previous copies).

As discussed elsewhere herein, in a distributed cache coherence model employing the use of dedicated protection memory areas, speedy data protection may be provided under certain communication protocols. However, a design based on a dedicated protection memory area may lead to memory waste and may yield sub-optimal data availability under certain conditions and scenarios, such as a "no node failure" condition or a "node failure recovery" scenario. According to the system described herein, a system for data redundancy which shares the cache coherence memory pool for protection purposes is provided. The design of the system described herein may work consistently across all communication protocols; yield better data availability with potentially less memory waste in "no node failure" conditions, and make data availability faster in various node failure scenarios.

A data write request may be initiated by one of the hosts 10 (I1) and received into the cache of one of the directors 20 (D1), which may be referred to as the "protection source," where a first copy C1 of user data will be created. Under known cache coherency systems and techniques, the copy C1 may be integrated into the cache coherency mechanism and made accessible to read requests from other initiator hosts. The cache of director D1 may make a subsequent protection request to the RMG which makes another copy C2 of the user data onto the memory of a different director (D2), which may be referred to as the "protection target." The cache memory of D1 and D2 form a memory pool for data protection purposes akin to a dedicated protection memory area. When the RMG's copy C2 of the data is safe on the protection target director D2, then the cache on the protection source directory D1 acknowledges the completion of the write to the initiator host I1. The copy operation between D1 and D2 may be made using a remote direct memory access (RDMA) interface using an appropriate communication protocol.

A data read request (e.g., for the data of the write request discussed above) may arrive at a director (e.g., D2), noting that a read request may be dispersed through multiple paths and through multiple directors for performance reasons to arrive at any director. With known cache coherency techniques, the director D2 may fetch another copy C2' of the data from the director D1 according to a request initiated by the director D2 to director D1. As a result, however, copies C2 and C2' are redundant copies of C1. It is noted that the use of the redundant copy C2' on the same director D2 where copy C2 exists in the dedicated protection space may inefficiently lead to wasted bandwidth and increased latency in servicing the user request on the director D2.

Moreover, in the case of failure of a node/director, a failure recovery process is initiated. Under known cache coherency systems and techniques, the failure recover process involves both protection source and protection target directors. For example, if the protection source director D1 fails, the only surviving version of copy C1 is copy C2 on the director D2. The data of copy C2 is now a dirty page. One of the steps of the failure recover process involves coordinating with the RMG to report copy C2 on the protection target to the recovery mechanism so that the recovery mechanism can integrate the copy C2 back into the cache. During this step, access to the user data that is involved in the failure recovery is suspended, because the cache is no longer coherent until such time that the only surviving copy C2 has been reintegrated in the cache.

The system described herein provides for changing the way user data redundant copies are made for the purpose of protection from director failure. As further discussed elsewhere herein, instead of relying on a dedicated protection memory area, data redundancy is provided using a shared cache coherence memory pool for protection purposes. In particular, according to an embodiment of the system described herein, when a write request is received by the cache component on a protection source director D1, after the initial copy C1 is made, a new type of request R1 may be sent to a protection target director D2. The request R1 may carry a copy of the data C1 to the director D2 and stored as copy C2 in the cache component of the protection target director D2. In an embodiment, the request R1 may be made in the form of a protocol control message (COM) and involve the CPU of the director D2. However, in other embodiments, an RDMA offload engine may be used that allows the transfer of R1 to take place without the cooperation of the CPU of the director D2.

Since copy C2 is available in the cache component of the protection target director D2, then any read request to the director D2 for a copy of the subject page may readily be serviced locally on the director D2. If copy C2 is used for a read in the case of "no node failure," then servicing the read locally at the director D2 will significantly improve the latency of the request. It is noted that no additional copies of the data (i.e. no copy C2') need to be generated. In other embodiments, as further discussed elsewhere herein, pairing up directors for volume access may be used to provide further advantageous operation.

Furthermore, in a director failure scenario, according to the system described herein, after failure of a director, a failure recovery process will no longer require inspection of dedicated protection memory space. Protection copies will instead be readily available in the cache of a protection target director. For example, as noted above, in the case of failure of the director D1, the copy C2 is available from the cache component of the director D2.

Additionally, it is noted that for the case where a COM message is used to transmit the request R1 and involving waking of the CPU of the protection target director (D2), the system described herein provides that every time the CPU on the target director is woken, the protection copy C2 may be integrated into the cache of the target director D2. On the target director D2, this may involve a hash lookup and a list insertion. This provides for an efficient use of the protection copy C2 in connection with the use of COM messaging and the resultant activation time of the CPU of the target director D2.

According to the system described herein, a read request landing on a director has a higher chance of a cache hit. Since every page in memory is accessible from the cache of two directors, instead of only one director, the chance of a cache hit doubles as compared with prior cache coherency implementations. Techniques may be used to pair up directors in stable relationships as protection partners. Furthermore, in other techniques, every virtual (logical) volume may be controlled to be exported through a pair of directors, called front-end (FE) exporting. Accordingly, if a read request would be a cache hit if it were received on a protection source director, but instead is, for some reason, received at the protection target director paired with the protection source director, then the read request received at the protection target is still a cache hit. Generally, for N protection copies, restricting a volume to be exported through N+1 directors that hold the copies achieves the above-noted cache hit benefits.

Figure 2:
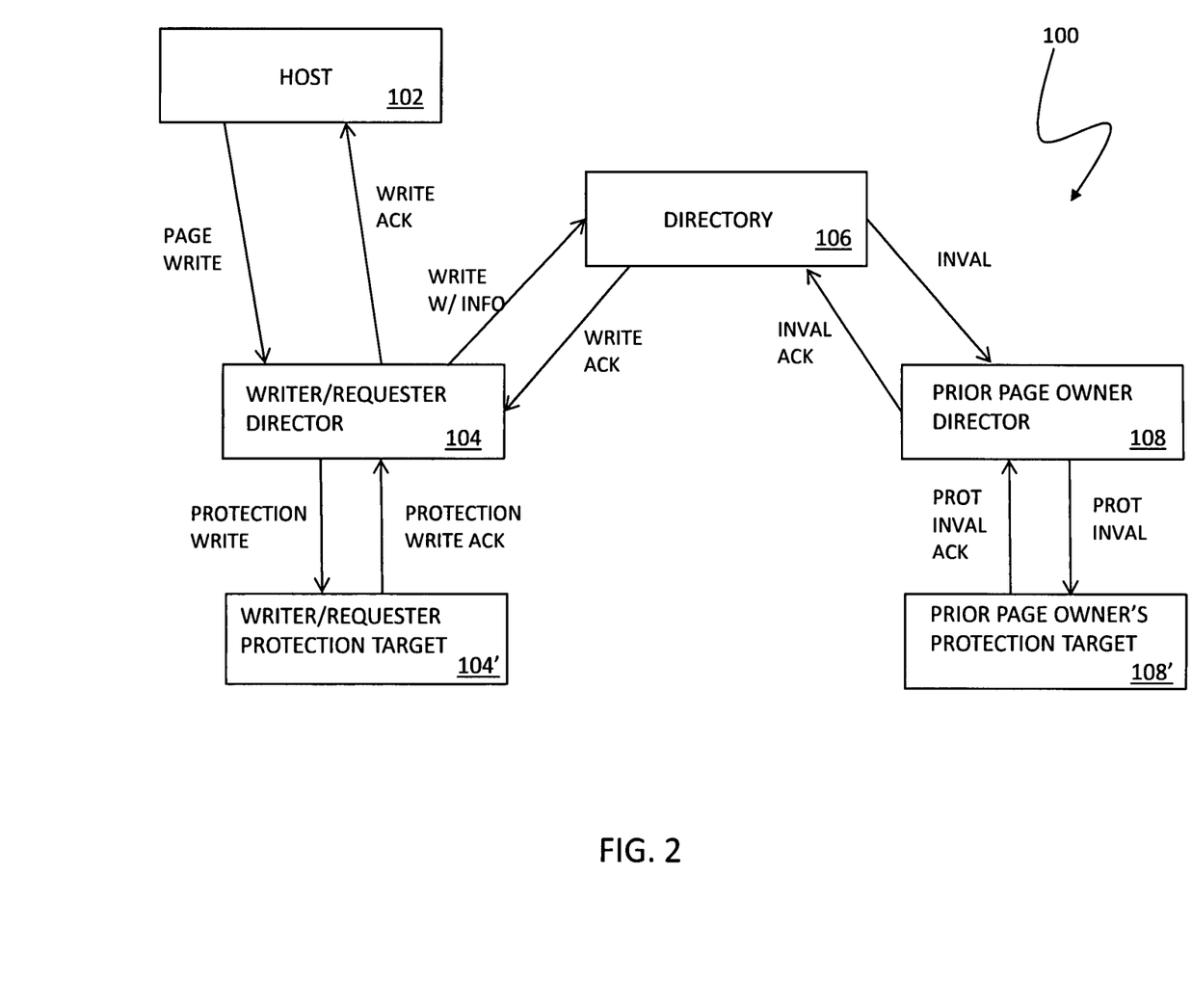
FIG. 2 is a schematic illustration of a cache coherency protection system for controlling page protection among director caches in accordance with page requests in accordance with an embodiment of the system described herein.

FIG. 2 is a schematic illustration of a cache coherency protection system 100 for controlling page protection among director caches in accordance with page requests that may be used in connection with an embodiment of the system described herein. As further discussed elsewhere herein, in the cache coherency protection system 100, a page read request may be a cache hit if received at a protection source director or received at a protection target director paired with the protection source director. In connection with handling a page write request, the cache coherency protection system 100 may include a writer/requester director 104 that receives the page write request from a host 102, a protection target director 104' that is partner of the writer/requester director 104, a directory 106, a prior owner page director 108 and a protection target director 108' that is a partner thereof. In this embodiment, the writer/requester director 104 of the write request is responsible for managing the knowledge of which director holds the protected page. Operations of the components of the cache coherency protection system 100 in connection with a new page write request are discussed with reference to the following flow diagram.

Figure 3:
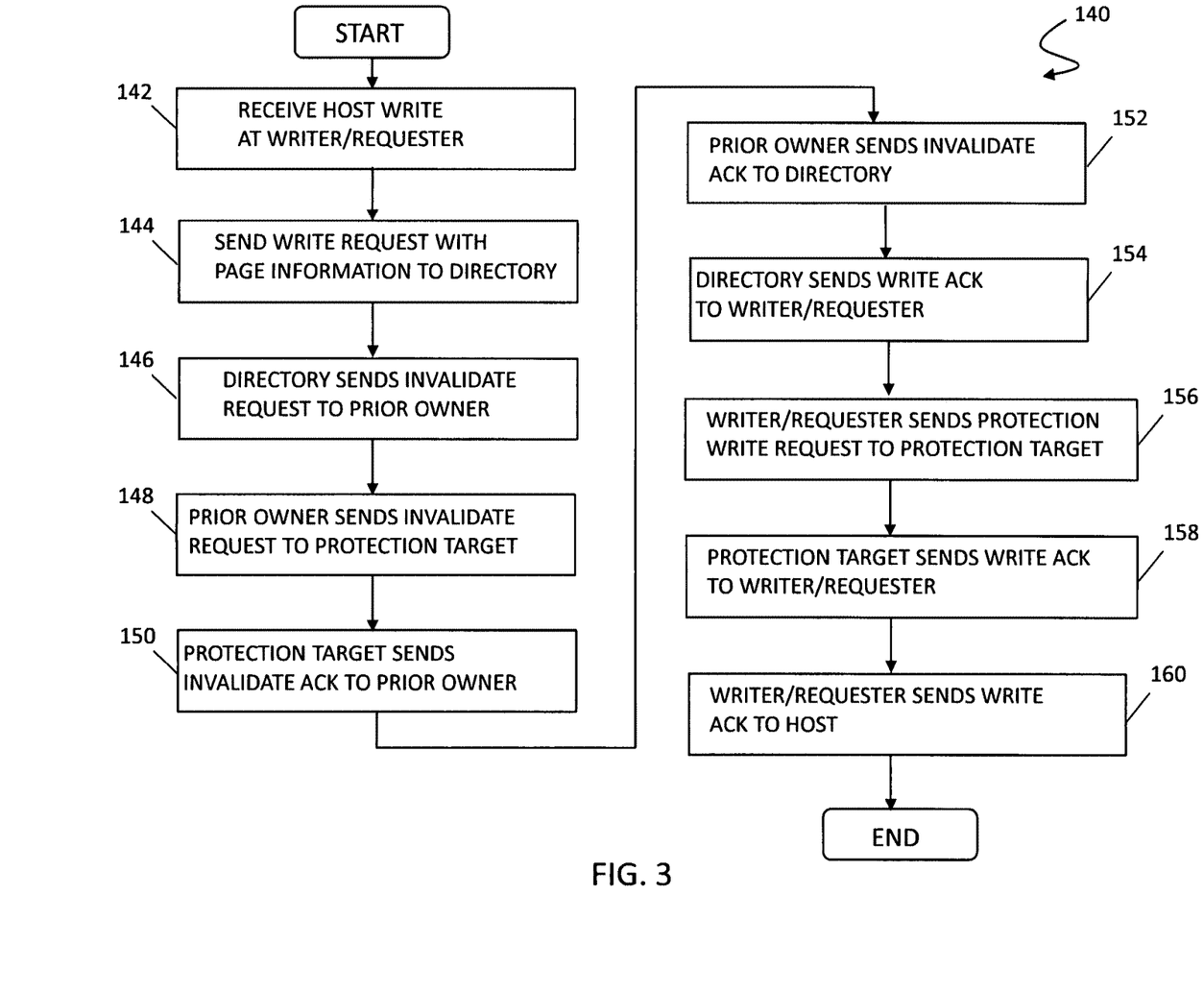
FIG. 3 is a flow diagram showing processing of the components of the cache coherency protection system according to an embodiment of the system described herein.

FIG. 3 is a flow diagram 140 showing processing of the components of the cache coherency protection system 100 according to an embodiment of the system described herein. At a step 142, the writer/requester director 104 receives a page write request from the host 102 and stores the page that is the subject of the write request in the cache of the write/requester 104. The writer/requester director 104 of the write request is responsible for managing the knowledge of which director holds the protected page. After the step 142, processing may proceed to a step 144 where the writer/requester director 104 sends a write request to the directory/chunk owner 106 to update the directory 106 with location information about the page that is the subject of the write request from the host 102. As discussed elsewhere herein, the directory 106 may be distributed across multiple directors that each include a portion of the directory and in which the chunk owner is the director that holds the chunk corresponding to active pages in it. After the step 144, processing may proceed to a step 146 where the directory 106 sends an invalidate request to invalidate the old page at the director 108 that was the prior owner of the page that is being written/modified.

After the step 146, processing may proceed to a step 148 where the prior-owner director 108 sends an invalidate request to its protection target director 108' to invalidate the copy of the old page stored on cache of the protection target director 108' in accordance with the system described herein. After the step 148, processing may proceed to a step 150 where the prior owner's protection target director 108' sends a protection page copy invalidate acknowledgement to the prior page owner director 108. After the step 150, processing proceeds to a step 152 where the prior page owner director 108 sends an invalid acknowledgement to the directory 106. After the step 152, processing may proceed to a step 154 where the directory 106 sends a write acknowledgement to the writer/requester director 104 for the write request of information about the page being written.

After the step 154, processing may proceed to a step 156 where the writer/requester director 104 sends a protection request with a copy of the page being written to its protection target director 104'. After the step 156, processing may proceed to a step 158 where the protection target director 104' acknowledges to the writer/requester director 104 the write of the protection copy of the page. After the step 158, processing may proceed to a step 160 where the writer/requester director 104 then acknowledges the write of the new page to the host 102. In the above-noted embodiment, it is noted that the directory/chunk owner 106 does not have knowledge of the page residing on a protection target director. After the step 160, processing is complete and it is noted that page of the write request is protected, being available from the cache of the writer/requester director 104 and in the cache of the protection target director 104'.

Figure 4:
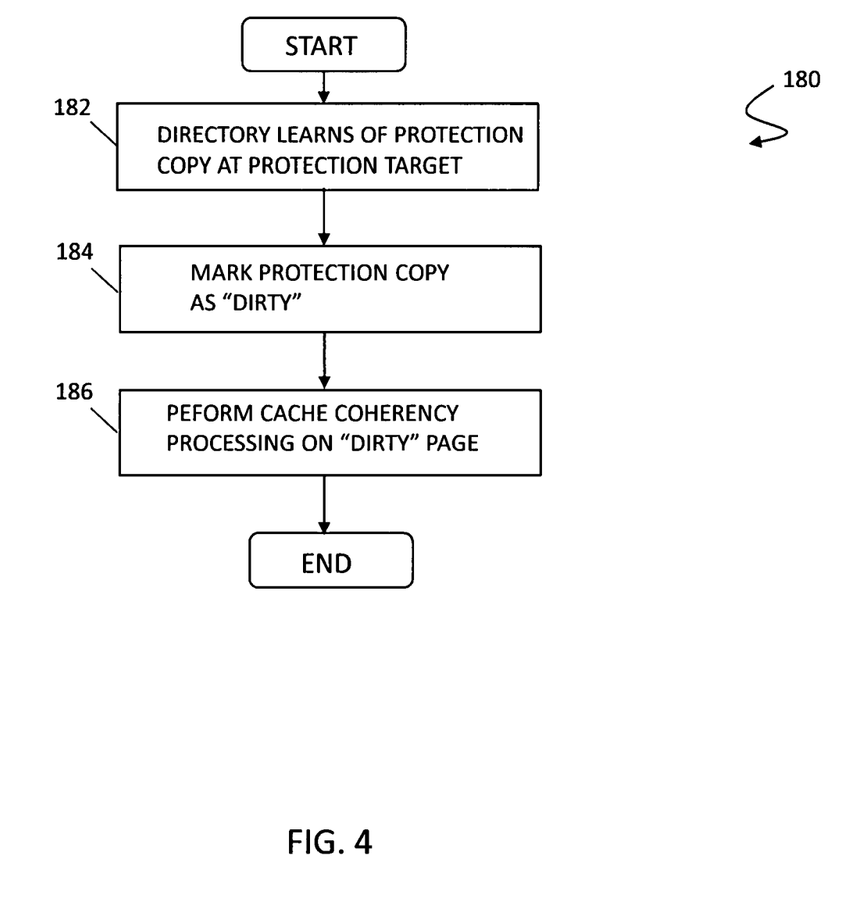
FIG. 4 is a flow diagram showing failure recovery processing of the cache coherency protection system for a page in response to failure of the page owner director according to an embodiment of the system described herein.

FIG. 4 is a flow diagram 180 showing failure recovery processing of the cache coherency protection system 100 for a page in response to failure of the page owner director according to an embodiment of the system described herein. At a step 182, upon the failure of the page owner director, the directory 106 learns of the protection target director that has a protection copy of the page via a process in which the RMG of the protection target director coordinates with the directory 106 to report to the directory that the protection target directory has a protection copy of the page. After the step 182, processing may proceed to a step 184 where the directory 106 marks the protection copy of the page as "dirty," meaning that it requires integration into the cache coherency mechanism according to the system described herein.

It is noted that in various embodiments, there may be more than one protection copy with multiple page owners. In such a scenario, the directory 106 may decide which protection copy will be marked "dirty" and thereby designated for integration into the failure recovery processing for the failed director. For example, the directory may choose the lowest rank of all page owners. It is noted that directory 106 may keep track of a page owner in connection with designation of a "dirty" copy. After the failure of a director, if the designated "dirty" copy page owner is still operating, then failure recovery processing may automatically proceed with the designated "dirty" copy without further selection. After the step 184, processing may proceed to a step 186 where cache coherency processing is performed on the "dirty" page copy such that a new copy of the page is created and stored on the cache of another director to provide page data redundancy and cache coherence according to the system as further discussed elsewhere herein. After the step 186, processing is complete.

Using director-pairing, one of the directors may lose its protection partner in connection with failure of the protection partner director. Therefore, a new partner may need to be selected. In an embodiment, the new partner may be chosen at random and may last as the protection partner only until the original protection partner returns. In an embodiment, a protection partner director may be selected by a simple algorithm such that a director D, protects to director (D+1)mod(N), where N is the total number of directors. Alternatively, multiple directors may be exposed to a volume, such that each director has multiple paths to the volume. Using the pairing concept, only two paths may be exposed at a time, and an additional path may be added in the case of director failure. Alternatively, an Asymmetric Logical Unit Access (ALUA) facility may specify multiple paths but specify a subset as "preferred paths." Then, the two "preferred paths" may be the main owner and protection partner, and, if one of them fails, then a director may be marked as "preferred path." It is noted that space reservation may be controlled using algorithms to dynamically load balance protection space on protection targets.

Figure 5:
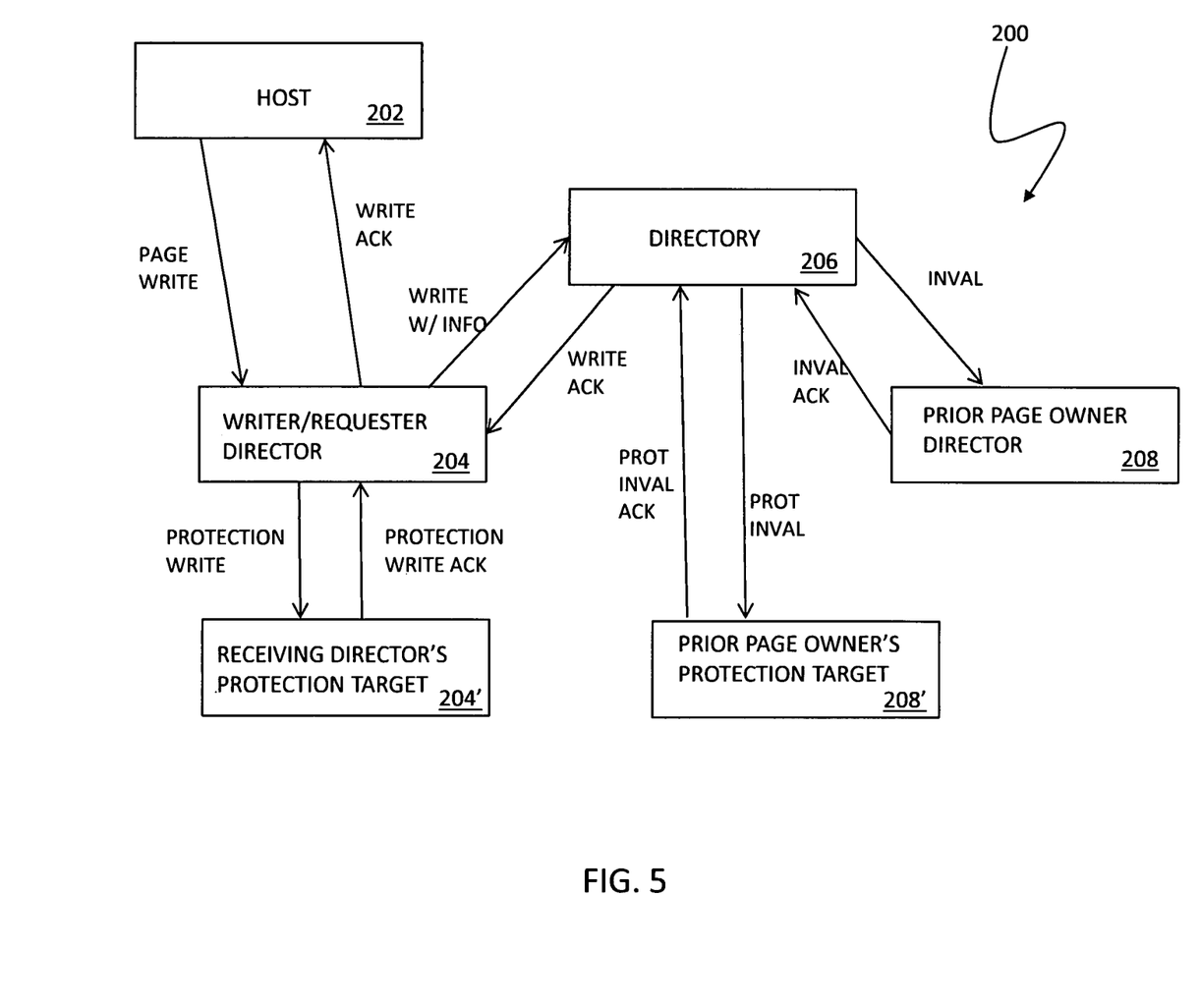
FIG. 5 is a schematic illustration of a cache coherency protection system for controlling page protection among director caches in accordance with a page write request according to another embodiment of the system described herein.

FIG. 5 is a schematic illustration of a cache coherency protection system 200 for controlling page protection among director caches in accordance with a page write request according to another embodiment of the system described herein. In this embodiment, the directory/chunk owner may be aware of one or more protection targets. The cache coherency protection system 200 may include a writer/requester director 204 that receives a page write request from a host 202, a protection target director 204' that is a partner of the writer/requester director 204, a directory 206, a prior owner page director 208 and a protection target director 208' that is a partner thereof. Operations of the components of the cache coherency protection system 200 in connection with a new page write request are discussed with reference to the following flow diagram.

Figure 6:
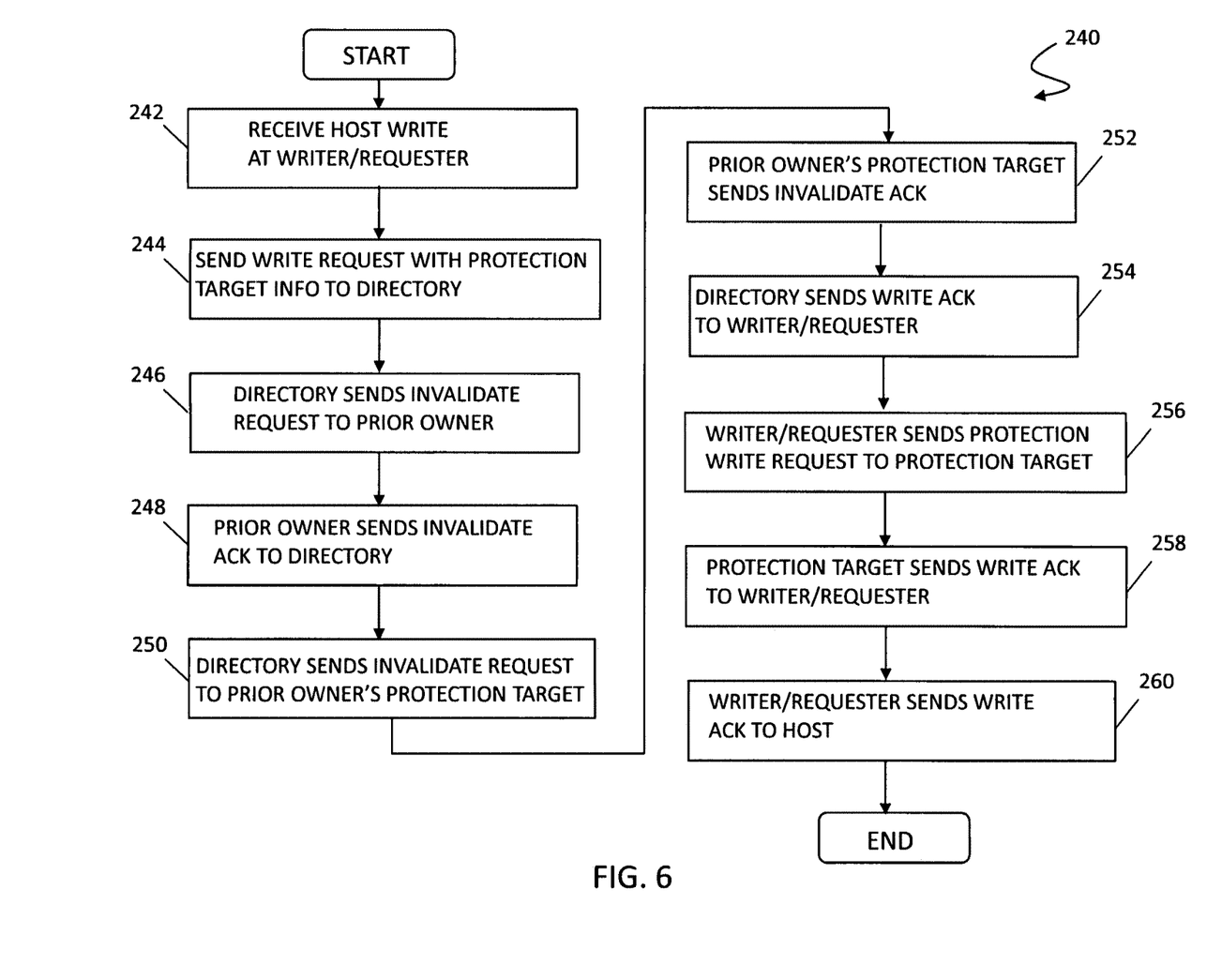
FIG. 6 is a flow diagram showing processing of the components of the cache coherency protection system according to an embodiment of the system described herein.

FIG. 6 is a flow diagram 240 showing processing of the components of the cache coherency protection system 200 according to an embodiment of the system described herein. At a step 242, the writer/requester director 204 receives a page write request from the host 202 and stores the page that is the subject of the write request in the cache of the write/requester 204. After the step 242, processing may proceed to a step 244 where the writer/requester director 204 sends a write request to the directory (chunk owner) 206 to update the directory 206 with protection target information of the protection target for the writer/requester director 204. As discussed elsewhere herein, the directory 206 may be distributed across multiple directors that each include a portion of the directory and in which the chunk owner is the director that holds the chunk corresponding to active pages in it. After the step 244, processing may proceed to a step 246 where the directory 206 sends an invalidate request to invalidate the old page at the director 208 that was the prior owner of the page that is being written/modified.

After the step 246, processing may proceed to a step 248 where the page owner sends an invalidate acknowledgement to the directory 206. After the step 248, processing may proceed to a step 250 where the directory 206 also sends an invalidate request to the protection target director 208' of the page owner 208 to invalidate the copy of the old page stored on the cache of the protection target director 208' in accordance with the system described herein. After the step 250, processing may proceed to a step 252 where the prior owner's protection target director 208' sends a protection page copy invalidate acknowledgement to the directory 206. It is noted that order of the steps 246/248 may be interchanged with the steps 250/252 and/or may be performed concurrently therewith. After the step 252, processing may proceed to a step 254 where the directory 206 sends a write acknowledgement to the writer/requester director 204.

After the step 254, processing may proceed to a step 256 where the writer/requester director 204 sends a protection request with a copy of the page being written to its protection target director 204'. After the step 256, processing may proceed to a step 258 where the protection target director 204' acknowledges to the writer/requester director 204 the write of the protection copy of the page. After the step 258, processing may proceed to a step 260 where the writer/requester director 204 then acknowledges to the host the write of the page to the host 202. After the step 260, processing is complete, and it is noted that page of the write request is protected, being available from the cache of the writer/requester director 204 and in the cache of the protection target director 204'.

Failure recovery in connection with the cache coherency protection system 200 may operate similarly as discussed in connection with the cache coherency protection system 100 except that there may be fewer circumstances in which rebuilding the directory is needed.

Figure 7:
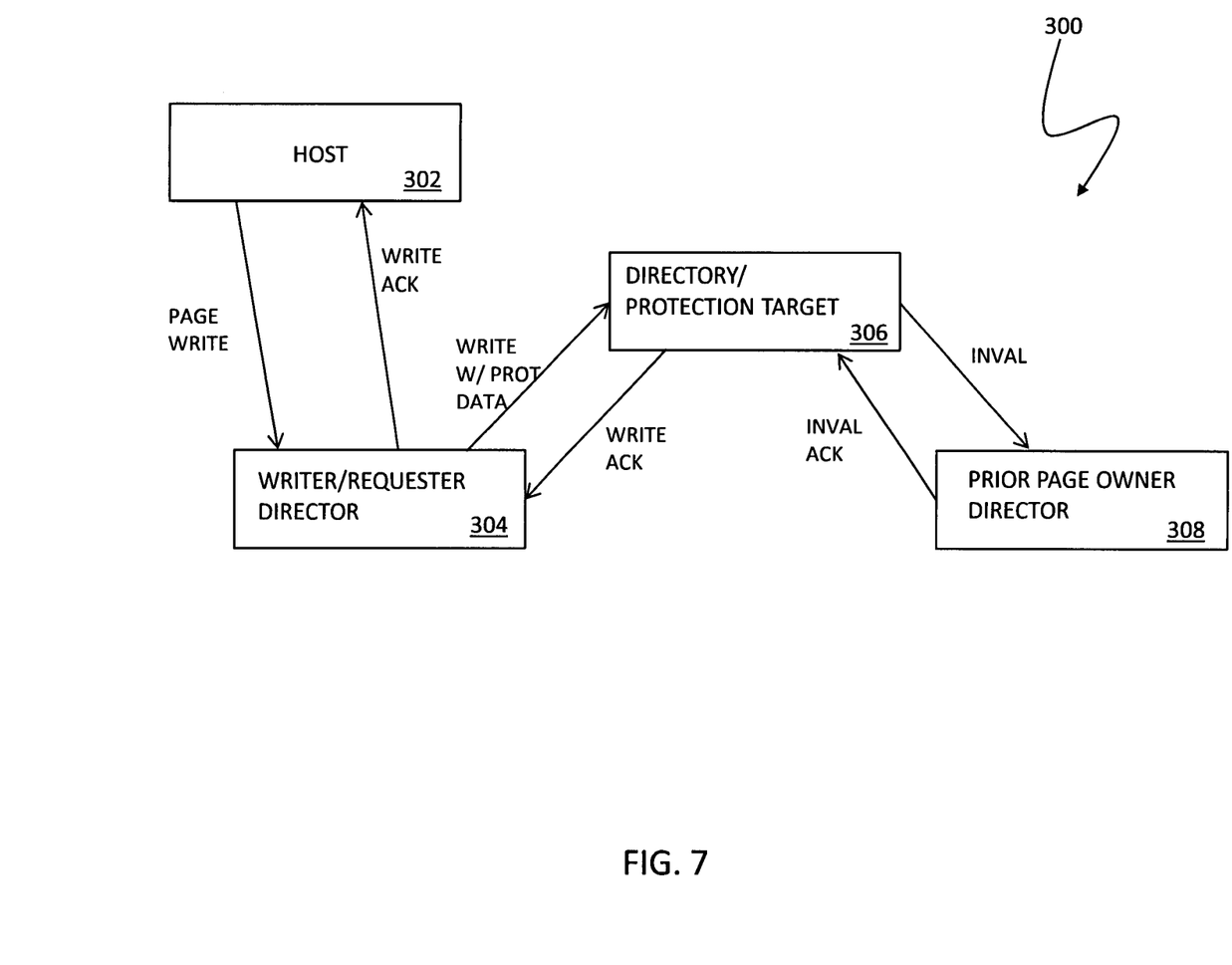
FIG. 7 is a schematic illustration of a cache coherency protection system for controlling page protection among director caches in accordance with a page write request according to another embodiment of the system described herein.

FIG. 7 is a schematic illustration of a cache coherency protection system 300 for controlling page protection among director caches in accordance with a page write request according to another embodiment of the system described herein. In this embodiment, the protection target may be the directory/chunk owner itself (i.e. the protection target of any rank member director) and in which the protection request (with the copy of page data) may accompany the control messages to the directory. The cache coherency protection system 300 may include a writer/requester director 304 that receives a page write request from a host 302, a directory/protection target 306 and a prior owner page director 308. Operations of the components of the cache coherency protection system 300 in connection with a new page write request are discussed with reference to the following flow diagram.

Figure 8:
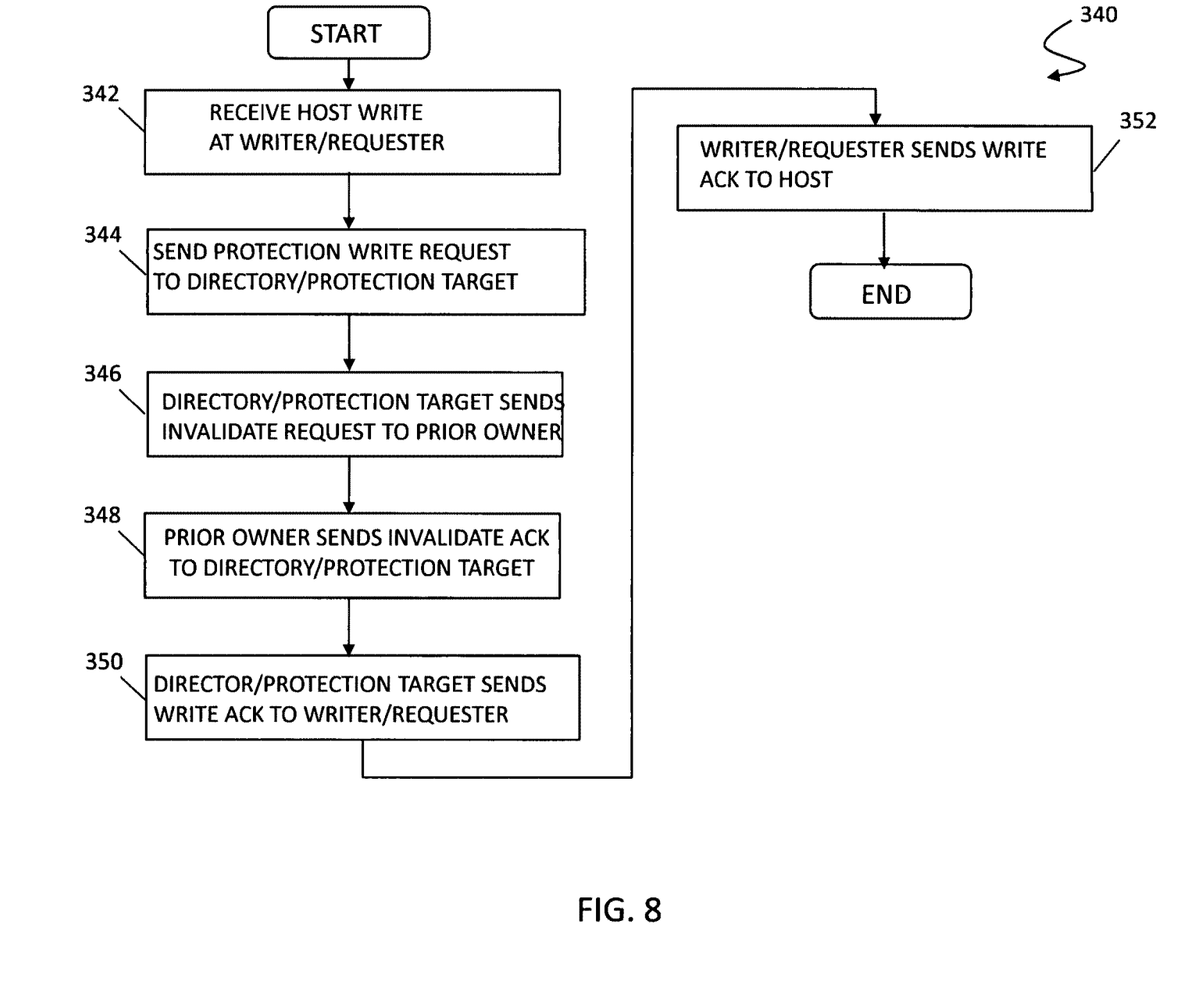
FIG. 8 is a flow diagram showing processing of the components of the cache coherency protection system according to an embodiment of the system described herein.

FIG. 8 is a flow diagram 340 showing processing of the components of the cache coherency protection system 300 according to an embodiment of the system described herein. At a step 342, the writer/requester director 304 receives a page write request from the host 302 and stores the page that is the subject of the write request in the cache of the write/requester 304. After the step 342, processing may proceed to a step 344 where the writer/requester director 304 sends a protection write request to the directory/protection target 306 with the page protection copy. As discussed elsewhere herein, the directory 306 may be distributed across multiple directors that each include a portion of the directory. After the step 344; processing may proceed to a step 346 where the directory/protection target 306 sends an invalidate request to invalidate the old page at the director 308 that was the prior owner of the page that is being written/modified.

After the step 346, processing may proceed to a step 348 where the page owner sends an invalidate acknowledgement to the directory/protection target 206. After the step 348, processing may proceed to a step 350 where the directory/protection target 306 sends a write acknowledgement to the writer/requester director 304. After the step 350, processing may proceed to a step 352 where the writer/requester director 304 then acknowledges to the host the write of the page to the host 302. After the step 352, processing is complete, and it is noted that page of the write request is protected, being available from the cache of the writer/requester director 304 and in the cache of the directory/protection target director 308.

Failure recovery in connection with the cache coherency protection system 300 may operate similarly as discussed in connection with the cache coherency protection system 200.

If the directory/chunk owner exists at a different site at a significant distance away, the protection copy may have to be transmitted across an intersite link, which may adversely affect the performance of the protection system 300. Accordingly, the cache coherency protection system 300 may be more advantageously used in environments such as single-clusters and/or when a significant majority of writes happens at the same cluster as the chunk owner, such as in mostly active-passive sites or in active-active configurations where the writes from two sites do not overlap across chunk boundaries. One optimization approach may be to piggyback protection data with the write request to the directory/chunk owner whenever the chunk owner is at the same cluster as the writer/requester director. Whenever that is not practicable or possible, the algorithm may then be modified to function like that of the cache coherency protection system 200.

Chunk owner migration processes may be driven by access patterns and the role of the protection target may move in connection therewith. If any particular volume is restricted to be FE-exported by only the set of "protection+writer/requester" directors, then there would be less chunk owner migration and thus less protection target migration. Normally, when a chunk owner migration occurs, a writer/requester's incorrect choice of chunk owner would result in a "miss" and a negative acknowledgement (NACK) from the former chunk owner. The writer/requester would then have to find the new chunk owner and try the request again. For the system described herein, where the protection copy accompanies the write request as with the cache coherency protection system 300, it would be desirable to avoid having to resend the protection copy in the event of a NACK. Accordingly, under the system described herein, the protection copy may be left on the old chunk owner, being satisfied that a copy has been made, and the RMG write request may be retried to the new chunk owner without the data while informing the new/true chunk owner that the old chunk owner has a copy. This may be viewed as an optimization to modify operation to that of the cache coherency protection system 200, as discussed elsewhere herein.

Further, it is noted that it is generally desirable for chunk owner placement to correspond to where the host request is received. The cache coherency protection system 300 may advantageously help ensure that locality involves the protection partner as well, to take advantage of the fact that the protection partner has a page copy as well.

Various embodiments discussed herein may be combined with each other in appropriate combinations in connection with the system described herein. Additionally, in some instances, the order of steps in the flowcharts, flow diagrams and/or described flow processing may be modified, where appropriate. Further, various aspects of the system described herein may be implemented using software, hardware, a combination of software and hardware and/or other computer-implemented modules or devices having the described features and performing the described functions. Software implementations of the system described herein may include executable code that is stored in a computer readable storage medium and executed by one or more processors. The computer readable storage medium may include a computer hard drive, ROM, RAM, flash memory, portable computer storage media such as a CD-ROM, a DVD-ROM, a flash drive and/or other drive with, for example, a universal serial bus (USB) interface, and/or any other appropriate tangible storage medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method for providing cache coherency protection, comprising:
   receiving a data write request for a data block at a first director from a host;
   immediately in response to receiving the data write request, and independent of any subsequent read request or write request:
      storing the data block in a cache of the first director;
      transmitting a copy of the data block from the first director to a second director; and
      storing the copy of the data block in a cache of the second director;
   maintaining a directory that identifies a location of the data block;
   in response to a read request received at a respective one of the first director or the second director for the data block, locally servicing the read request using the data block or the copy of the data block stored in the cache of the respective one of the first director or the second director;
   in response to failure of the first director, a failure recovery process is initiated using the data block or the copy of the data block stored in the cache of the second director, and a third director operates as a protection partner of the second director in place of the first director during a failure recovery process until the first director returns to operation and the first and second directors become protection partners; and
   in response to failure of the second director, the failure recovery process is initiated using the data block or the copy of the data block stored in the cache of the first director and the third director operates as a protection partner of the first director in place of the second director during the failure recovery process until the second director returns to operation and the first and second directors become protection partners.

2. The method according to claim 1, wherein the directory includes a plurality of components that are distributed among at least the first director and the second director.

3. The method according to claim 1, wherein the first director manages location information of the copy of the data block.

4. The method according to claim 1, wherein the directory manages location information of the copy of the data block.

5. The method according to claim 1, further comprising:
   in response to a second data write request involving a write to the data block to generate a new data block:
      storing the new data block in a cache of a director that receives the second data write request;
      transmitting a copy of the new data block to a cache of a partner director that is a partner of the director that receives the second data write request; and
      invalidating the data block on the first director and the copy of the data block on the second director.

6. The method of claim 1, wherein the second director includes a CPU, and wherein the copy of the data block is transmitted from the first director to the second director as part of an RDMA request that does not require cooperation of the CPU of the second director.

7. A non-transitory computer readable storage medium storing computer software for providing cache coherency protection, the computer software comprising:
   executable code that receives a data write request for a data block at a first director from a host;
   executable code that, immediately in response to receiving the data write request, and independent of any subsequent read request or write request:
      stores the data block in a cache of the first director;
      transmits a copy of the data block from the first director to a second director; and
      stores the copy of the data block in a cache of the second director;
   executable code that maintains a directory that identifies a location of the data block;
   executable code that locally services a read request using the data block or the copy of the data block stored in the cache of one of the first director or the second director; and
   executable code that initiates a failure recovery process in response to failure of the first director by using the data block or the copy of the data block stored in the cache of the second director, and a third director operates as a protection partner of the second director during the failure recovery process of the first director and until the first director returns to operation and the first and second directors become protection partners; and executable code that initiates a failure recovery process in response to failure of the second director by using the data block or the copy of the data block stored in the cache of the first director, and a third director operates as a protection partner of the first director during the failure recovery process of the second director until the second director returns to operation and the first and second directors become protection partners.

8. The non-transitory computer readable storage medium according to claim 7, wherein the directory includes a plurality of components that are distributed among at least the first director and the second director.

9. The non-transitory computer readable storage medium according to claim 7, wherein the first director manages location information of the copy of the data block.

10. The non-transitory computer readable storage medium according to claim 7, wherein the directory manages location information of the copy of the data block.

11. The non-transitory computer readable storage medium according to claim 7, further comprising:
executable code that, in response to a second data write request involving a write to the data block to generate a new data block:
stores the new data block in a cache of a director that receives the second data write request;
transmits a copy of the new data block to a cache of a partner director that is a partner of the director that receives the second data write request; and
invalidates the data block on the first director and the copy of the data block on the second director.

12. The non-transitory computer readable storage medium of claim 7, wherein the second director includes a CPU, and wherein the copy of the data block is transmitted from the first director to the second director as part of an RDMA request that does not require cooperation of the CPU of the second director.

13. A system for providing cache coherency protection, comprising:
a first director having at least one processor and a cache;
a second director having at least one processor and a cache, wherein, immediately in response to the first director receiving a data write request for a data block from a host, and independent of any subsequent read request or write request, the data block is stored in the cache of the first director, a copy of the data block is generated by the first director and transmitted to and stored on the cache of the second;
a directory that identifies a location of the data block, wherein the directory is distributed among at least the first director and the second director; and
a processor that performs the following:

in response to a read request received at a respective one of the first director or the second director for the data block, locally servicing the read request using the data block or the copy of the data block stored in the cache of the respective one of the first director or the second director;
in response to failure of the first director, a failure recovery process is initiated using the data block or the copy of the data block stored in the cache of the second director, and a third director operates as a protection partner of the second director in place of the first director during a failure recovery process until the first director returns to operation and the first and second directors become protection partners; and
in response to failure of the second director, the failure recovery process is initiated using the data block or the copy of the data block stored in the cache of the first director and the third director operates as a protection partner of the first director in place of the second director during the failure recovery process until the second director returns to operation and the first and second directors become protection partners.

14. The system according to claim 13, wherein at least one of the following is provided: (i) the first director manages location information of the copy of the data block or (ii) the directory manages location information of the copy of the data block.

15. The system according to claim 13, further comprising:
at least one fourth director that is a partner of the third director, wherein, in response to a second data write request that is received at the third director involving a write to the data block to generate a new data block:
the new data block is stored in a cache of the third director;
a copy of the new data block is transmitted to a cache of the fourth director; and
the data block is invalidated on the first director and the copy of the data block is invalidated on the second director.

16. The system according to claim 13, wherein the second director is selected as a protection target of the first director using an algorithm.

17. The system of claim 13, wherein the copy of the data block is transmitted from the first director to the second director as part of an RDMA request that does not require cooperation of the at least one processor of the second director.

* * * * *